Oct. 16, 1962  R. OHRNBERGER  3,058,559
SPINDLE MOUNTING FOR MACHINE TOOLS
Filed July 24, 1959  3 Sheets-Sheet 1

Inventor
Robert Ohrnberger
By Ralph B. Stewart
Attorney

Oct. 16, 1962   R. OHRNBERGER   3,058,559
SPINDLE MOUNTING FOR MACHINE TOOLS
Filed July 24, 1959   3 Sheets-Sheet 2

Inventor
Robert Ohrnberger
By Ralph B. Stewart
Attorney

Oct. 16, 1962   R. OHRNBERGER   3,058,559
SPINDLE MOUNTING FOR MACHINE TOOLS
Filed July 24, 1959   3 Sheets-Sheet 3

Inventor
Robert Ohrnberger
By Ralph B. Stewart
Attorney

United States Patent Office 3,058,559
Patented Oct. 16, 1962

3,058,559
SPINDLE MOUNTING FOR MACHINE TOOLS
Robert Ohrnberger, Bad Homburg vor der Höhe, Germany, assignor to Vereinigte Werkzeugmaschinenfabriken A.G., Frankfurt am Main, Germany, a corporation of Germany
Filed July 24, 1959, Ser. No. 829,414
Claims priority, application Germany July 26, 1958
9 Claims. (Cl. 192—91)

The invention relates to arrangements for mounting of spindles of machine tools and is particularly useful in the mounting of spindles of boring and milling mechanisms.

One object of the invention is to devise an arrangement for the damping of transverse oscillations in the working spindle.

Another object is to devise hydraulic control means to effect de-coupling and re-coupling of a working spindle with respect to a driving shaft.

The spindles of machine tool mechanisms are subject to oscillation-exciting forces during the processing operations on the work pieces, such forces arising from tools fastened to the spindles and also from the component elements in the machine which move, such as motors and gears. These forces excite oscillations in the spindles and such oscillations occur mainly as transverse oscillation, as their frequency lies in the range of the natural frequency of bending vibrations of the spindles. As a result of these oscillations there appear in the cut surfaces of the work pieces so called "chattermarks." Moreover, the vibrations cause a strong tool abrasion or wear especially when use is made of tools of hard metal. This disadvantage is particularly noticeable for example in boring and milling mechanisms where the working spindles have a large free swing and relatively small forces cause bending vibrations to be set up. Under these circumstances an undisturbed or smooth cutting operation can often be accomplished only with great difficulty or sometimes not at all.

In the arrangement according to the invention these disadvantages are avoided by mounting the operating spindle so that it is surrounded by a casing providing an annular space which is filled with oil under constant pressure. The oil may be supplied to the annular space through narrow openings in the outer wall of the annular space. Upon the occurrence of oscillations, the internal friction of the oil in its movement within the annular space, and the resistance upon passing through the narrow openings so damp the oscillations that the above described disadvantages no longer occur.

The invention is shown by way of example in the accompanying drawings.

Figure 1:
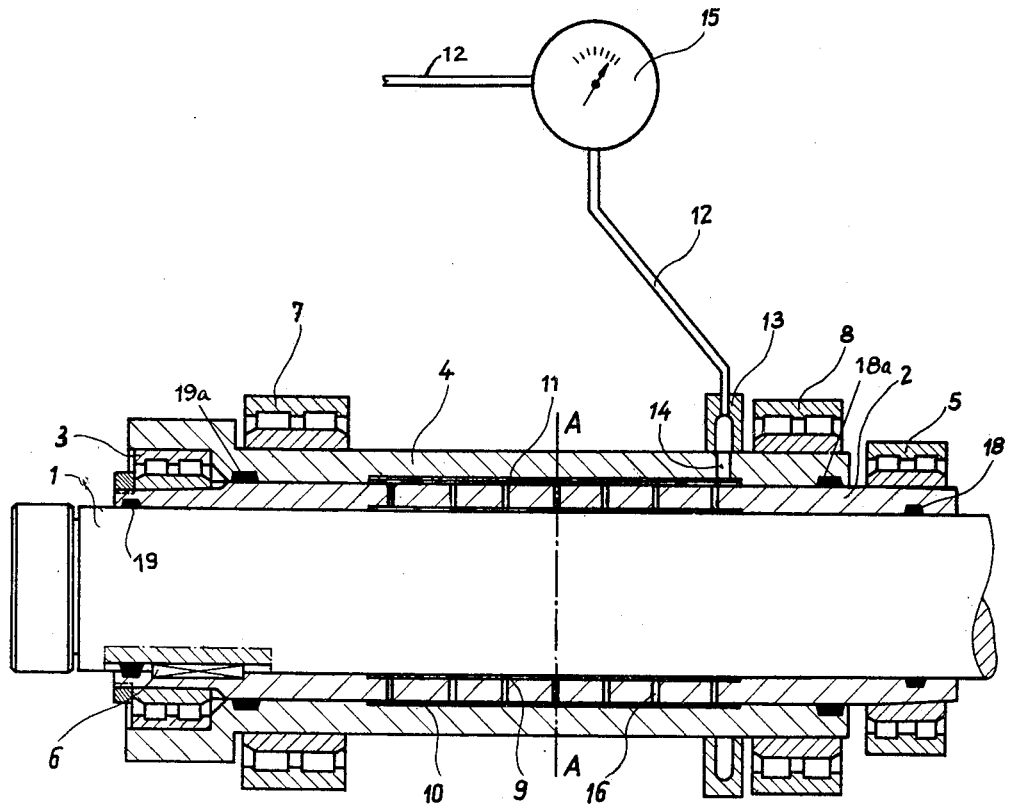
FIG. 1 is a longitudinal sectional view of the bearing portion of the spindle system of a boring and milling mechanism.
Figure 2:
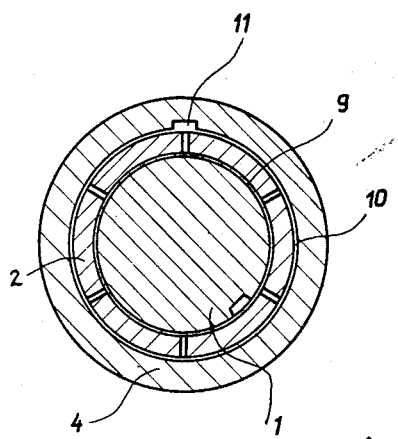
FIG. 2 is a section along line A—A of the arrangement according to FIG. 1.

Referring to FIGS. 1 and 2, a working spindle 1 is mounted to be shiftable axially in a hollow spindle 2 and is mounted so that it cannot rotate with respect to spindle 2. The hollow spindle 2 is mounted to turn on its axis by means of a shaft bearing 3 supported in a main spindle 4 and a second bearing 5 supported in the spindle housing, not shown, of a boring and milling mechanism. Hollow spindle 2 is a drive shaft and is driven by any suitable driving means, such as a gear attached to an extension of the shaft at one of its ends. The transmission of the rotary movement from the driven hollow spindle 2 to the working spindle 1 is accomplished by a spline 6 on spindle 2 engaging a longitudinal groove in spindle 1. The main spindle 4 supporting the shaft bearing 3 is mounted by way of shaft bearings 7 and 8 which are supported in the spindle housing, not shown. Between the working spindle 1 and the hollow spindle 2, which forms a casing for spindle 1, there is provided an annular space 9 filled with oil, the space having a small thickness. The oil is supplied to space 9 under pressure through narrow bores 16 formed in the wall of hollow spindle 2. These narrow bores are distributed over the whole circumference of the hollow spindle 2. Between the hollow spindle 2 and the main spindle 4, which forms a casing for spindle 2, there is an additional annular space 10 of small thickness and which widens at one place into a longitudinal groove 11 through which the pressure oil is distributed over the whole length of the annular space 10 which is connected with annular space 9 through bores 16. Both annular spaces 9 and 10 lie between the bearing positions for the main spindle 4 which are formed by the shaft bearings 7 and 8. The oil is supplied through conduit 12 from a suitable source to a ring connection element 13 surrounding spindle 4 and through a radial bore 14 in spindle 4 to the longitudinal groove 11. By a known form of pressure regulator 15 inserted in conduit 12, the pressure of the oil supplied to the annular spaces 9 and 10 can be regulated. Ring packings 18 and 19 between the working spindle 1 and the hollow spindle 2 prevent the escape of oil from the annular space 9, and like packings 18a and 19a prevent the escape of oil from space 10.

The arrangement according to the invention works in such a way that upon occurrence of transverse oscillations of the working spindle 1 a damping of these oscillations occurs both through the inner friction of the oil and also through the resistance that arises upon automatic passage of the oil through the openings 16. By reason of the fact that the oil stands under pressure, that is, under a suitable pressure (which may range from 4 to 20 atmospheres, that is, from about 60 to 300 lbs./sq. in.) the annular spaces are kept completely filled with oil even if through the oscillation process and through leakage losses oil emerges from the inner annular space. By changing the oil pressure one can obtain a change in the range of oscillations in which a damping effect occurs.

Figure 3:
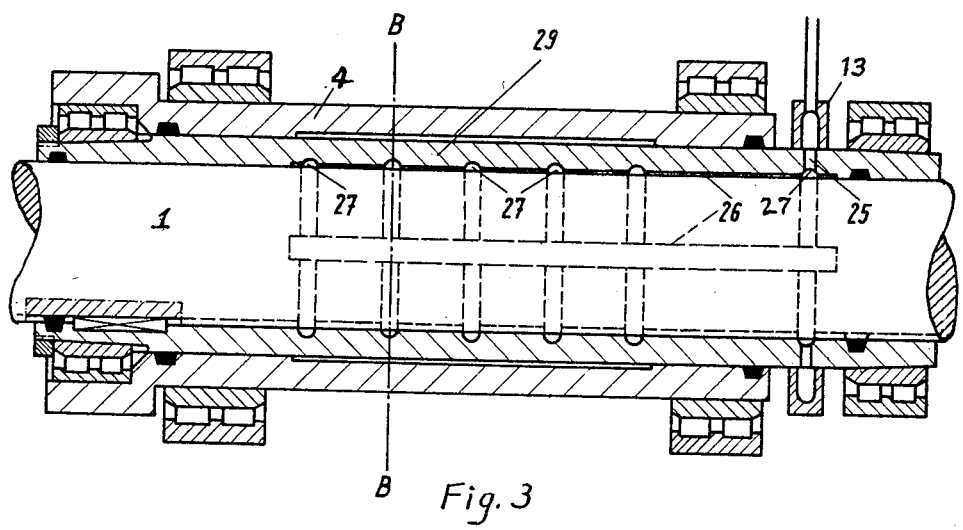
FIG. 3 shows another embodiment of a spindle bearing according to FIG. 1.
Figure 4:
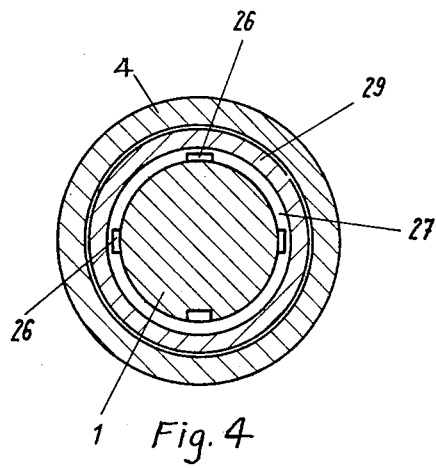
FIG. 4 is a section on line B—B of the arrangement according to FIG. 3.

In an additional example, a modification according to FIG. 3, oil under pressure is carried directly to the annular space surrounding the working spindle 1 through a bore 25 in a hollow spindle 29 which corresponds to the hollow spindle 2 in FIG. 1. In this case the ring connecting element 13 surrounds a portion of spindle 29. The annular space surrounding spindle 1 is made of the order of size of the usual bearing clearance and is therefore not made visible in FIG. 3. The oil from bore 25 passes through the longitudinal groove 26 formed in the inner wall of spindle 29 to a number of ring grooves 27 formed at spaced locations along the length of spindle 29. Circular grooves 27 distribute the oil to the annular space surrounding the working spindle 1. The manner of operation of this arrangement is the same as that already described in connection with FIG. 1. Here also internal friction of the oil present in the annular space prevents rapid movement of the working spindle 1, whereby a damping of the oscillations in the working spindle 1 is obtained.

Figure 5:
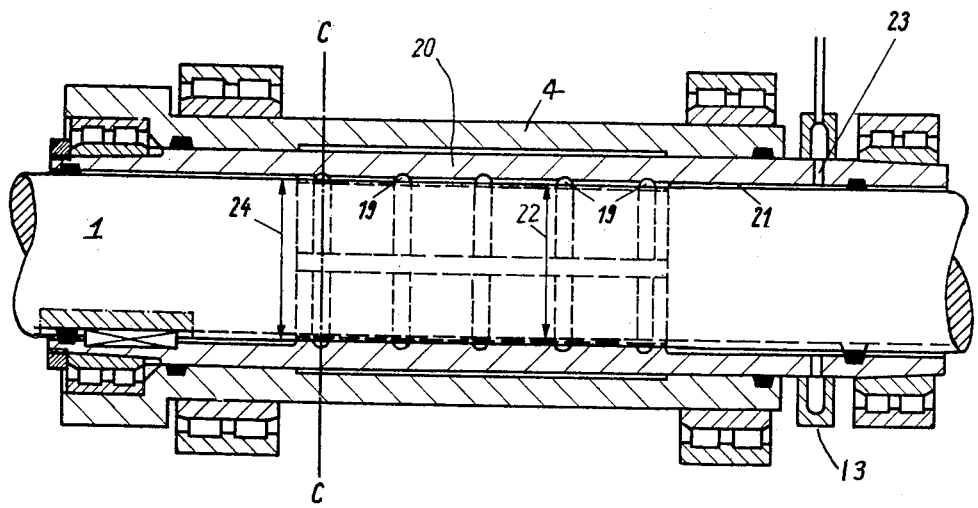
FIG. 5 shows a third embodiment of a spindle bearing according to FIG. 1 and in which oil pressure is used to control the coupling between the working spindle and the drive shaft.

Furthermore, by changing the oil pressure it is possible, with certain changes in the construction, to control the longitudinally shiftable working of spindle 1 which normally would be held fast with the hollow spindle under a lower pressure condition and no lengthwise shift of spindle 1 can occur. If a longitudinal shift is to be made, the oil pressure is raised to decouple the two spindles. FIG. 5 shows an arrangement for embodiment of these expedients. Between the working spindle 1 and a hollow driving shaft 20, which corresponds to the hollow spindle 2 in FIG. 1, there is provided a negative clearance, that is, the inner diameter 22 of the hollow shaft 20 is slightly smaller than the outer diameter 24 of the working spindle 1. Thus, the hollow shaft 20 in the normal state with lowered oil pressure, or with no oil pressure, clamps itself to the working spindle 1 and prevents longitudinal shifting of spindle 1. Through a bore 23 and longitudinal groove 21 (which correspond to bore 25 and groove 26 in FIG. 3) the oil under pressure reaches the spaced ring grooves 19 which correspond to ring grooves 27 in FIG. 3. Instead of using several ring grooves 19 a single torus shaped groove or recess may be used which extends over a part of the length of the hollow spindle 20. In this case clamping of spindle 1 would be effected by short lengths of shaft 20 on each side of the single groove. If the oil pressure is raised to a sufficiently high value then the hollow shaft 20 expands radially under the pressure exerted by the oil so that the grip on working spindle 1 is released and the spindle can be shifted in its axial direction. For the re-establishment of a fixed connection between the two spindles, the oil pressure will again be reduced, whereby the hollow shaft 20 again contracts and effects a renewed grip on the working spindle 1.

The oil pressure required to effect un-clamping of the working spindle will vary with the strength of shaft 20 and it may range from 20 to 80 atmospheres, that is, roughly from 300 to 1200 lbs./sq. in.

Figure 6:
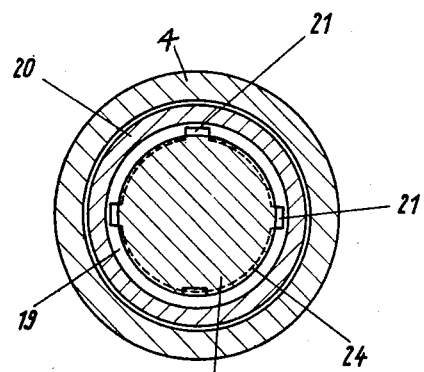
FIG. 6 is a section along line C—C of the arrangement according to FIG. 5.

It will be understood that the arrangement shown in FIGS. 5 and 6 is useful for controlling the coupling between two shafts which are mounted for relative rotation and are not connected by a spline connection.

When small bores are provided to increase the resistance to flow of the damping oil, such as bores 16 in FIG. 1, these holes may vary in size in different installations and may range in diameter from 1 to 3 millimeters. Bores 23 and 25 may be of a diameter from 3 to 5 millimeters, and the internal diameter of the supply conduit may be of the order of 8 millimeters.

In the various examples selected for illustration of the invention, the sleeve 4 which forms a casing for shaft 2, is mounted in bearings for rotation about its axis, but this is not essential to the present invention in its broader aspect, and this sleeve may be held stationary or it may be an integral part of the housing. Also, in some cases, the sleeves 2 and 20, which form casings for spindle 1, need not be mounted for rotation and may be formed integrally with the housing.

I claim:

1. An arrangement for damping transverse oscillations in a machine tool spindle mounting comprising a rotatable spindle, a casing surrounding and rotatable with said spindle, a pair of spaced bearing assemblies for supporting said casing and said spindle, said casing providing an annular space between said bearing assemblies and forming a closed chamber completely surrounding said spindle, and means for supplying oil under constant pressure to said chamber, said means including at least one restricted opening.

2. An arrangement according to claim 1 in which said casing comprises a hollow shaft surrounding a portion of said working spindle.

3. An arrangement according to claim 1 wherein the thickness of the annular space is so dimensioned that it exceeds the usual clearance of friction bearings by a small amount.

4. An arrangement according to claim 2 and including an annular casing surrounding said hollow shaft and providing an additional annular space surrounding said hollow shaft, and an oil passage connecting said additional annular space to be maintained full of oil under constant pressure.

5. An arrangement according to claim 4 wherein both annular spaces are located between two bearing seats of the main annular casing.

6. An arrangement according to claim 4 wherein one of said casing members is provided with at least one longitudinal groove through which the oil is distributed over the whole length of one of the annular spaces.

7. An arrangement according to claim 1 and including an adjustable pressure regulator connected between the pressure oil source and said chamber whereby the pressure of the oil in the chamber can be regulated.

8. In combination, a spindle member, a hollow shaft member surrounding said spindle in strong frictional engagement with the spindle to provide a coupling between the shaft and spindle, one of said coupled members having at least one annular groove formed in the surface thereof which has frictional engagement with the other member, and means for supplying a lubricating fluid to said annular groove of sufficient pressure to expand said hollow shaft and release said frictional coupling.

9. An arrangement for damping the transverse oscillations of a working spindle of a machine tool comprising a casing surrounding said spindle between bearing locations and providing an annular space forming a closed chamber surrounding said spindle, and means including at least one restricted opening for supplying oil under pressure to said chamber, said casing being held in an expanded condition by a certain pressure of said oil and contractable under a reduced oil pressure to effect a clamping of the working spindle by said casing, said clamping being releasable by restoring said oil pressure to said certain value, whereby relative movement may take place between said spindle and said casing.

References Cited in the file of this patent

UNITED STATES PATENTS

| | | |
|---|---|---|
| 1,515,683 | Jones | Nov. 18, 1924 |
| 2,054,055 | Klahn | Sept. 8, 1936 |
| 2,660,485 | Gerard | Nov. 24, 1953 |
| 2,729,518 | O'Connor | Jan. 3, 1956 |
| 2,885,046 | Norlindh | May 5, 1959 |

FOREIGN PATENTS

| | | |
|---|---|---|
| 716,522 | Great Britain | Oct. 6, 1954 |
| 1,081,361 | France | Dec. 20, 1954 |
| 333,634 | Switzerland | Dec. 15, 1958 |

OTHER REFERENCES

"Installation of Ball and Roller Bearings," Machinery Magazine, December 1955, pp. 180–181.